United States Patent [19]

Rokni et al.

[11] Patent Number: 4,714,902
[45] Date of Patent: Dec. 22, 1987

[54] GASEOUS NON LINEAR DISPERSION LASER BEAM CONTROL

[75] Inventors: Mordechai Rokni, Mevasseret, Israel; Allen M. Flusberg, Newton, Mass.

[73] Assignee: AVCO Everett Research Laboratory, Inc., Everett, Mass.

[21] Appl. No.: 745,044

[22] Filed: Jun. 17, 1985

[51] Int. Cl.$^4$ .......................... G02F 1/32; G02B 6/36
[52] U.S. Cl. ..................................... 332/7.51; 350/344
[58] Field of Search ....................... 350/354, 393, 356; 332/7.51

[56] References Cited

U.S. PATENT DOCUMENTS

| | | | |
|---|---|---|---|
| 449,937 | 2/1885 | Blazey | 332/7.51 |
| 3,671,747 | 6/1972 | Duguay | 332/7.51 |
| 3,813,605 | 12/1974 | Szoke | 332/7.51 |
| 3,999,839 | 12/1976 | Bjorklund et al. | 350/354 |
| 4,012,699 | 3/1977 | Gibbs et al. | 350/354 |
| 4,145,671 | 3/1979 | Hellwarth | 332/7.51 |
| 4,209,690 | 6/1980 | Rentzepis | 332/7.51 |
| 4,364,014 | 12/1982 | Gray | 330/4.3 |
| 4,410,239 | 10/1983 | Kaplan et al. | 350/393 |
| 4,558,923 | 12/1985 | Hoffman et al. | 350/354 |
| 4,573,767 | 5/1986 | Jewell | 350/354 |
| 4,585,301 | 4/1986 | Bialkowski | 350/354 |

OTHER PUBLICATIONS

"Coherent Excitation, Incoherent Excitation & Adiabatic States".
"Coupled Wave Theory for Thick Hologram Gratings".
"Probing Adiabatic States".
"Technique for Real-Time High-Resolution Adaptive Phase Compensation".
Laser-Controlled Optics Using Near-Resonance Nonlinear Dispersion in Gaseous Medium".
IEEE J. Quant. Elect., vol. QE-14, No. 9 (9/78), Yariv, "Phase Conjugate Optics & Real-Time Holography", pp. 650-660.
IEEE Spectrum (6/81), Smith et al., pp. 26-33.

Primary Examiner—Salvatore Cangialosi
Attorney, Agent, or Firm—M. E. Frederick

[57] ABSTRACT

A method of providing laser controlled real-time optics and optic systems for a laser beam or beams utilizing near resonance nonlinear dispersion in a collision dominated gaseous medium. Refractive optical elements may be provided that function as spherical or curved reflectors and refractive lens or prisms for expanding or contracting a laser beam or beams as well as providing gratings for providing partial or total reflection or deflection of a laser beam. The generation of a grating in accordance with the invention permits total deflection of large cross-section and powerful laser beams by the investment of a moderate amount of power. Real-time color holographic displays may also be provided and phase front aberrations caused by a laser amplifier may also be corrected.

16 Claims, 6 Drawing Figures

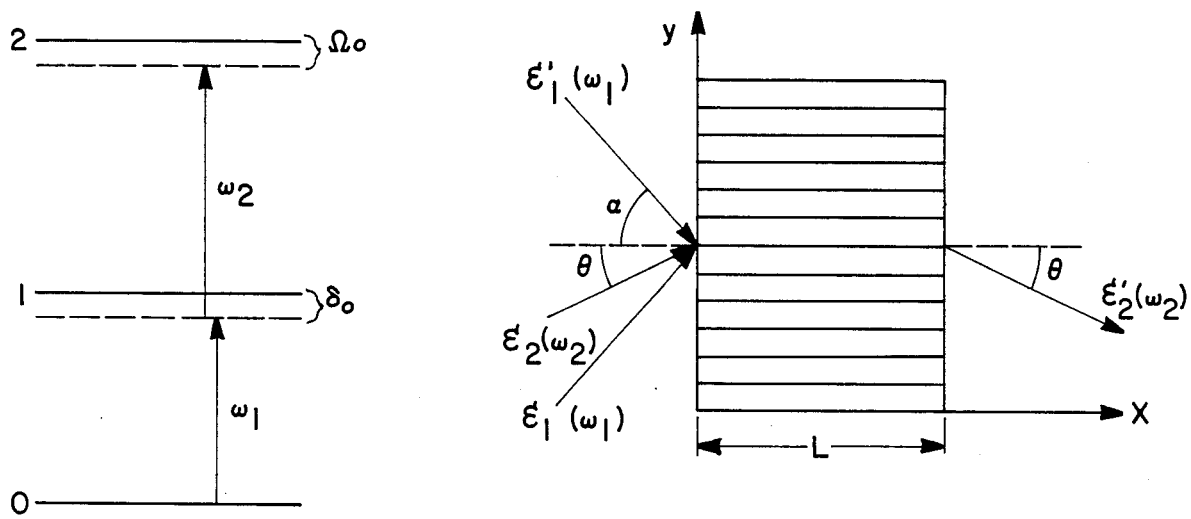
Fig 1
Fig 2
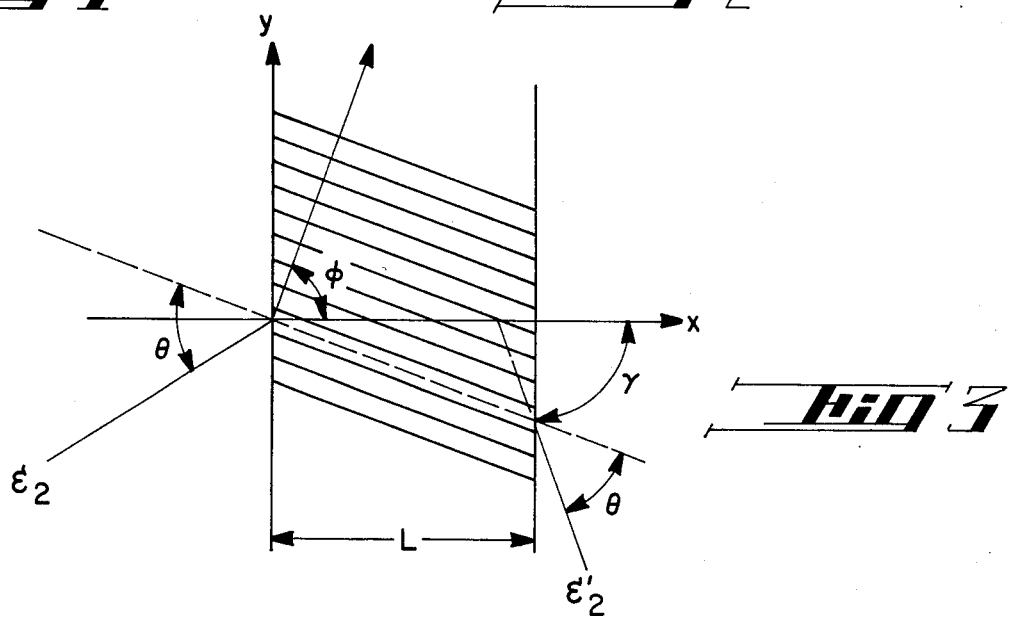
Fig 3
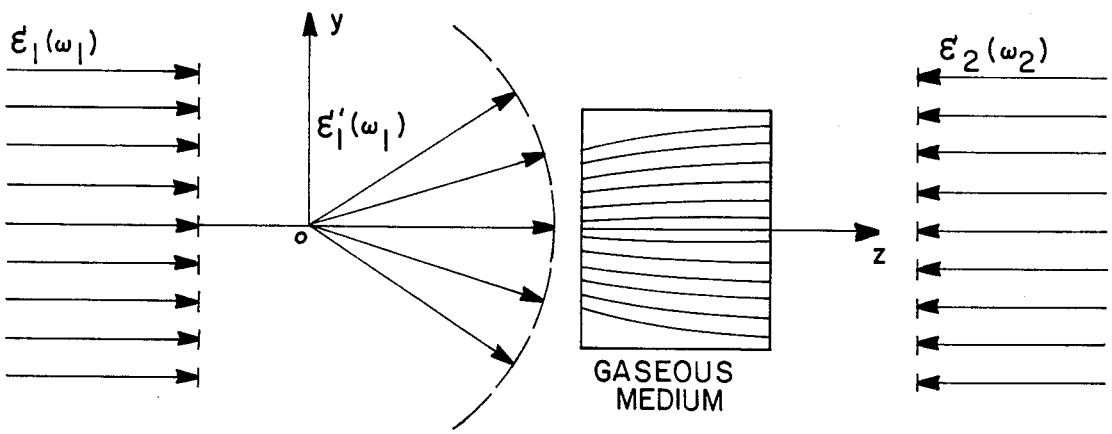
Fig 4

BUFFER GAS → → VACUUM

VACUUM

GASEOUS NON LINEAR DISPERSION LASER BEAM CONTROL

This invention relates to control beams and more particularly to the control of laser beams by utilizing nonlinear dispersion in a gaseous media under collision-dominated conditions.

DISCUSSION OF PRIOR ART

It is known that the introduction of a light beam at an appropriate first wave length in a suitably selected gaseous medium under collision-free conditions will induce a change in the refractive index of the medium for light at a second wave length, where the change in the refractive index is proportional to the local intensity of the light beam at the first wave length. This phenomenon is known as and referred to as nonlinear dispersion.

It has been observed experimentally as reported by D. Grischkowsky, "Coherent Excitation, Incoherent Excitation, and Adiabatic States," Phys. Rev. A14, 802–812 (1976) and J. E. Bjorkholm and P. F. Liao, "Line Shape and Strength of two-Photon Absorption in Atomic Vapor with a Resonant or Nearly Resonant Intermediate State," Phys. Rev. A14, 751–760 (1976) that nonlinear dispersion exists in a gaseous medium, i.e., the effect of the radiation field at one frequency on the refractive index of a gaseous medium at a different frequency. See also "Probing Adiabatic States," A. Flusberg and S. R. Hartmann, Phys. Rev. A14, 813–815 (1976) which supports the analysis of Grischkowsky. The experiments were carried out and the observations thereof, were explained by a perturbation analysis, using the adiabatic approximation and a collision-free condition in the gaseous medium.

Heretofor, nonlinear dispersion has not been of any particular value or considered useful for practically operative laser-controlled optics because, inter alia, under the collosion-free conditions with which it has been used substantially complete deflection of an intense laser beam necessitates an intense control laser beam with at least substantially the same photon number density as that of the beam to be deflected.

Numerous inexpensive techniques other than nonlinear dispersion are available for deflection of low intensity laser beams and nonlinear dispersion was not considered feasible or desirable for reasons including that noted immediately hereinabove.

SUMMARY OF THE INVENTION

We have found, however, that under collision-dominated conditions in accordance with the invention the power requirement of the field generating dispersion is substantially smaller than the power of the beam to be deflected and that it is possible to at least substantially, if not totally, deflect appropriate laser beams including high-power laser beams without having to invest an unreasonably large amount of power in the controlling laser beam as was required heretofor. This is because, broadly, we have found that under collision-dominated conditions the effect of unit intensity of the controlling laser beam at its frequency on the refractive index at the controlled laser beam frequency is much larger that the effect of unit intensity of the controlled laser beam on the refractive index at the frequency of the controlling laser beam.

In accordance with our invention real-time laser-controlled refractive optical techniques and devices may be provided as well as real-time laser-controlled holographic optical techniques and devices. Refractive optical elements may be provided in accordance with the invention that function as spherical or curved reflectors and refractive lenses or prisms for expanding or contracting a laser beam or beams, as well as providing gratings that function to provide partial or total reflection or deflection of a laser beam. The generation of a grating in accordance with our invention will permit at least substantial, if not total, deflection of large cross section and powerful laser beams by the investment of a moderate amount of power. Since the response time of the gaseous medium is dependent on the lifetimes involved and on gaseous diffusion which can be made as short as a nanosecond, fast switches for high power lasers can also be provided. The present invention also lends itself to the production of real-time color holographic displays. Still further, the present invention also lends itself to the correction of laser beam phase front aberrations caused by laser amplifiers.

BRIEF DESCRIPTION OF THE DRAWINGS

The novel features that are considered characteristic of the invention are set forth in the appended claims; the invention itself, however, both as to its organization and method of operation, together with additional objects and advantages thereof, will best be understood from the following description of a specific embodiment when read is conjunction with the accompanying drawings, in which:

FIG. 1 is a diagram showing energy levels of a gas suitable for use in accordance with the invention;

FIG. 2 is a diagramatic representation of a gaseous medium functioning as a grating;

FIG. 3 is a diagramatic representation of a gaseous medium functioning as a grating having grating planes at a slant angle $\phi$;

FIG. 4 is a diagramatic representation of a gaseous medium functioning as a lens;

DETAILED DESCRIPTION OF THE INVENTION

Figure 5:
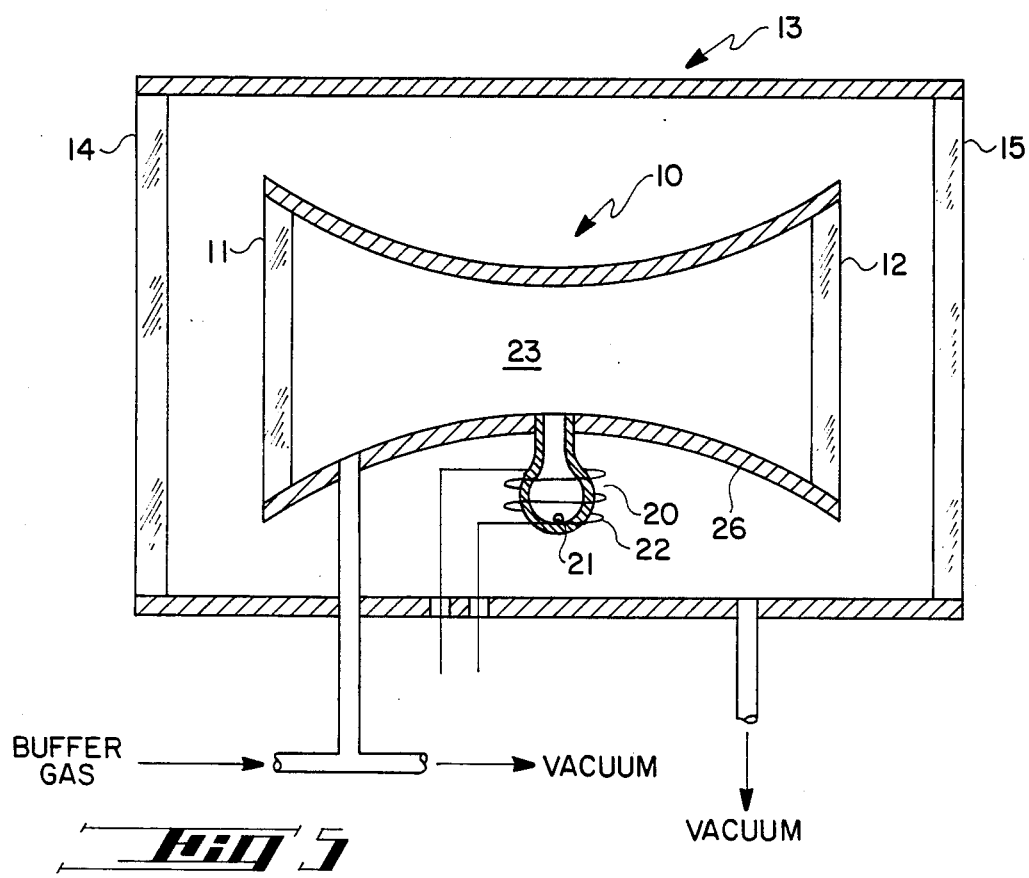
FIG. 5 is an illustration of one form of gas cell for a gaseous medium in accordance with the invention.

To facilitate understanding of the invention, the most relevant principles of nonlinear dispersion including nonlinear dispersion under collision dominated conditions will now be discussed. By way of example an atomic or molecular gaseous media suitable for use in accordance with the present invention (more fully discussed hereinafter) may have energy levels as shown in FIG. 1 where the 0→1 and 1→2 transitions are allowed electric dipole transitions. If such a suitable gas of atoms is irradiated by two radiation fields $\epsilon_1 (\omega_1)$ and $\epsilon_2 (\omega_2)$, where $\omega_1$ is off resonance from the 0→1 transition by $\delta_o$, $\omega_2$ is off resonance from the 1→2 transition by $\Delta_o$ and the sum of the frequencies is off resonance from the 0→2 two-photon transition by $\Omega_o = \delta_o + \Delta_o$, the interaction with the two fields will induce a nonlinear refractive index of the medium for both frequencies, where the refractive index $\Delta n^{NL}(\omega_2)$ is proportional to the intensity at $\omega_2$ and the refractive index at $\Delta n^{NL}(\omega_1)$ is proportional to the intensity at $\omega_1$.

The nonlinear polarization induced in the medium, may be calculated starting with the equation for the density matrix $\rho$ of the medium:

$$\frac{d\rho_{kj}}{dt} = \frac{i}{\hbar}[\rho,H]_{kj} - \frac{\rho_{kj}}{\tau_{kj}} \quad (1)$$

where $H=H_o+V$, $H_o$ is the Hamiltonian of the free atoms $\rho_{kj}$ is the kj matrix element of $\rho$, i is equal to $(-1)^{\frac{1}{2}}$, h is the ratio of Planck's constant to $2\pi$, $\tau_{kj}$ is the decay time of $\rho_{kj}$, V is the interaction Hamiltonian, and k and j are indices taking on the values 0, 1 or 2. The last term in Equation (1) is introduced phenomenologically to account for the homogeneous relaxation of the excited states.

The interaction Hamiltonian V is given by:

$$V = -(\mu \cdot \epsilon) = -\mu^x \cdot \epsilon$$

where $\mu$ is the electric dipole moment operator, x is the polarization direction of the field and $$\epsilon = \epsilon_1 + \epsilon_2 = \tfrac{1}{2}(E_1 e^{i\omega_1 t} + E_2 e^{i\omega_2 t}) + c.c.$$

where $\epsilon$ is the total electric field of the light, $\epsilon_1$ is the electric field at $\omega_1$, $\epsilon_2$ is the electric field at $\omega_2$, $E_1$ and $E_2$ are slowly variety amplitude, t represents time, and c.c. means complex conjugate.

Insertion of the Hamiltonian in Equation (1) gives four equations for the density matrix elements:

$$\frac{d\rho_{10}}{dt} + i\omega_{10}\rho_{10} = \frac{iV_{10}}{\hbar}(\rho_{11} - \rho_{00}) - \frac{iV_{12}}{\hbar}\rho_{20} - \frac{\rho_{10}}{\tau_{10}} \quad (2a)$$

$$\frac{d\rho_{11}}{dt} = \frac{i}{\hbar} - \frac{\rho_{11}}{\tau_{11}} \quad (2b)$$

$$\frac{d\rho_{20}}{dt} + i\omega_{20}\rho_{20} = \frac{i}{\hbar}[\rho_{21}V_{10} - \rho_{10}V_{21}] - \frac{\rho_{20}}{\tau_{20}} \quad (2c)$$

$$\frac{d\rho_{21}}{dt} + i\omega_{21}\rho_{21} = \frac{iV_{21}}{\hbar}(\rho_{22} - \rho_{11}) - \frac{iV_{01}}{\hbar}\rho_{20} - \frac{\rho_{21}}{\tau_{21}} \quad (2d)$$

where $\hbar\omega_{nm}$ is the energy difference between levels n and m; and n,m are indices which may take on the values 0, 1 and 2. Equations (2a)–(2d) may be solved with the following assumptions:
(a) None of the transitions are saturated, i.e., $$\rho_{11} \ll \rho_{00} \text{ and } \rho_{22} \ll \rho_{11};$$

(b) $\rho_{10}$ interacts more strongly with $\epsilon_1$ than with $\epsilon_2$; and
(c) the interaction 1→2 is weaker than the 0→1, i.e., $$|\rho_{12}V_{21} - \rho_{21}V_{12}| \ll |\rho_{10}V_{01} - V_{10}\rho_{01}|.$$

Inserting the fields in Equations (2a)–(2d), retaining only near resonance terms, substituting $$\rho_{10} = \rho_{10}(0)e^{-i\omega_1 t}$$

$$\rho_{20} = \rho_{20}(0)e^{-i(\omega_1+\omega_2)t}$$

$$\rho_{21} = \rho_{21}(0)e^{-i\omega_2 t}$$

and making the slowly-varying-amplitude approximation:

$$\frac{d\rho_{ij}(0)}{dt} \sim 0$$

Equations (2a)–(2d) may be reduced to four algebraic equations for the amplitudes of the density matrix elements.

The polarization of the gaseous medium is given by $$p = \sum_{i,j} \rho_{ij}\mu_{ji}. \quad (3)$$

where the symbol $\Sigma$ denotes a sum.

If the solutions of the algebraic equations are substituted for the density matrix elements, and the real and imaginary parts of the susceptibility are separated, we obtain that the nonlinear refractive index $\Delta n^{NL}(\omega_2)$ at frequency $\omega_2$ is given by the formula:

$$\Delta n^{NL}(\omega_2) = \frac{\pi|\mu_{01}^X|^2|\mu_{12}^X|^2|E_1|^2\rho_{00}}{2\hbar^3\delta^2}\left[\frac{2\tau_{11}\Delta_0}{\tau_{col}\Delta^2} + \frac{\Omega_0}{|\Omega|^2}\right] \quad (4)$$

where $\mu_{01}^X$ is the 0–1 matrix element of the x component of the dipole operator, $$\delta = \delta_0 - \frac{i}{\tau_{10}}\ ;\ \Delta = \Delta_0 - \frac{i}{\tau_{21}}\ ;\ \Omega = \Omega_0 - \frac{i}{\tau_{20}},$$

and $\tau_{col}$ is defined by:

$$\frac{1}{\tau_{10}} = \frac{1}{2\tau_{11}} + \frac{1}{\tau_{col}}. \quad (5)$$

From Equations (2a)–(2d) it will be clear that $\tau_{11}$ measures the decay rate of the population in the first excited state, while $\tau_{10}$ measures the decay rate of the phase of this state. In the absence of collisions it may be shown that $$\frac{1}{\tau_{10}} = \frac{1}{2\tau_{11}},$$

it having been assumed in Equation (5) that the collisions affects the phase of the first excited state rather than its population density.

Equations (4) and (5) may now be used to differentiate between two different regimes: (a) the prior art collision-free regime in which $\tau_{col} \gg 2\tau_{11}$ and (b) the collision-dominated regime of the present invention where $\tau_{col} \ll \tau_{11}$.

From Equation (4) it can be shown that under collision-free conditions:

$$\text{sign }(\Delta n) = \text{sign }(\Omega_o) \quad (6)$$

Stated differently, Equation (6) says that normal dispersion behavior exists near a resonance transition with the resonance corresponding to a true simultaneous two-photon transition. In this case, the proximity of $\omega_1$ to the 0→1 resonance affects the magnitude of $\Delta n^{NL}(\omega_2)$, but does not affect the sign of $\Delta n^{NL}(\omega_2)$, which is only dependent on the sign of $\Omega_o$.

On the other hand in the collision dominated regime ($\tau_{col} \ll \tau_{11}$) of the present invention, it can be shown from Equation (4) that:

$$\text{sign }(\Delta n) = \text{sign }(\Delta_0) \quad (7)$$

This corresponds to a sequence of two single-photon transitions, 0→1 followed by 1→2, disturbed on the way by dephasing collisions. In fact it may be shown that the nonlinear refractive index in this case is proportional to the actual population density in level 1.

If now Equation (4) is expressed in terms of the absorption coefficient $\gamma(\omega_1)$ for the beam at frequency $\omega_1$:

$$\Delta n^{NL}(\omega_2) = \frac{\lambda_1 \tau_{10} \gamma(\omega_1) \mu_{12}^{X\,2}}{16\pi \hbar^2} \left[ \frac{2\tau_{11}\Delta_0}{\tau_{col}|\Delta|^2} + \frac{\Omega_0}{|\Omega|^2} \right] |E_1|^2 \quad (8)$$

where $\lambda_1 = 2\pi c/\omega_1$ is the wavelength corresponding to $\omega_1$. Similarly, calculating the nonlinear refractive index at frequency $\omega_1$ gives:

$$\Delta n^{NL}(\omega_1) = \frac{\lambda_1 \tau_{10}\gamma(\omega_1) |\chi_{12}|^2}{16\pi\hbar^2} \frac{Re(\Omega^* \delta^{*2})}{|\Omega|^2|\delta|^2} |E_2|^2 \quad (9)$$

or in short Equations (8) and (9) can be written:

$$\Delta n^{NL}(\omega_2) = \beta_1 |E_1|^2 \quad (10)$$

$$\Delta n^{NL}(\omega_1) = \beta_2 |E_2|^2 \quad (11)$$

It may be noticed from Equations (10) and (11) that under collision-free conditions $[(2\tau_{11}\Delta_0/\tau_{col}|\Delta|^2) << |\Omega_0|/|\Omega|^2]$ and off resonance ($|\delta_0| >> 1/\tau_{10}$; $|\Omega_o| >> 1/\tau_{20}$), that the coefficients $\beta_1$ and $\beta_2$ are equal, whereas under collision-dominated conditions $((2\tau_{11}|\Delta_o|/\tau_{col}|\Delta|^2) >> |\Omega_o|/|\Omega|^2)$ we have $|\beta_1| >> |\beta_2|$. The implications of the above noted differences is the basis for selecting collision-dominated conditions for laser-controlled optics applications in accordance with the invention.

As previously noted, nonlinear dispersion in gaseous media may be used in accordance with the invention to control the phase front of a laser beam at wavelength $\lambda_2$, by another laser beam at wavelength $\lambda_1$. Real-time laser-controlled refractive optical elements as well as real-time laser-controlled holographic optical elements can also be provided.

A real-time laser-controlled refractive lens or prism can be generated by appropriate tailoring of the spatial intensity distribution of the controlling laser beams in the gaseous medium. From the preceding discussion it will be clear that only the collision-dominated regime is suitable for the types of application here concerned. This is because in the collision-dominated regime $|\beta_1| >> |\beta_2|$ and therefore the effect of unit intensity of a controlling laser beams at $\omega_1$ on the refractive index at $\omega_2$ is much larger than the effect of unit intensity of a controlled laser beam on the refractive index at the controlling laser beam at ($\omega_1$) as shown by Equations (10) and (11).

An analysis of power requirement for refractive optics shows that the power requirement of the laser for providing the controlling laser beam in accordance with the present invention is strongly dependent on the diameter of the laser beam to be controlled. This is because in an ordinary refractive lens, the phase lag in the center of the beam, compared to the beam boundary is a quadratic function of the beam diameter.

Consideration will now be given to the application of the present invention to real-time laser-controlled holographic optics.

Real-time holographic optical elements for a laser beam at frequency $\omega_2$ may be provided, using nonlinear dispersion in an appropriate gaseous medium in accordance with the invention. If the holographic image of the desired optical element is first produced in a conventional manner in the medium, by interfering two coherent laser beams of frequency $\omega_1$ having suitable phase fronts. The spatial intensity modulation of the field at $\omega_1$ produced by the interference will cause an identical spatial modulation of the refractive index of the gaseous medium at the frequency $\omega_2$. Thus, for example, a volumeric planar grating for light of frequency $\omega_1$ can be generated by interfering two non-colinear plane waves of frequency $\omega_1$ in the medium, while a real-time holographic lens can be produced by interfering in the medium a plane wave of frequency $\omega_1$ with a mutually coherent spherical wave of the same frequency.

The response time of such an optical element is determined by the life-time involved and can be as short as 10 nsec. In fact, spatial diffusion decreases the effective lifetime, thus decreasing response time even further.

Directing attention now to the provision of a real-time holographic grating: Consider as shown in FIG. 2 two coherent laser beams at frequency $\omega_1$, and with equal intensity, impinging at an angle to each other, on a gaseous atomic or molecular medium, with appropriate energy levels and transitions as shown and described in connection with FIG. 1. In FIG. 2 (and FIG. 3), the X=0 plane is the plane where the grating planes start and interaction begins and the plane X=L is the plane where the grating planes end and the interaction stops. If the phase fronts of the fields $\epsilon_1$ and $\epsilon'_1$ are reasonably planar in the interaction volume, then the interference between these two fields will generate a real-time holographic grating with sinusoidal spatial modulation of the refractive index at frequency $\omega_2$. Defining $\epsilon_1$ and $\epsilon'_1$ as:

$$\epsilon_1 = \tfrac{1}{2}[E_1 e^{i(\underline{K}_1 \underline{r} - \omega_1 t)} + c.c.]$$

and $$\epsilon'_1 = \tfrac{1}{2}[E_1' e^{i(\underline{K}_1' \underline{r} - \omega_1 t)} + c.c.]$$

where $E_1$, $E'_1$ are complex, underlined variables denote vector quantities; $\underline{K}_1$ and $\underline{K}_1'$ are the wave vectors of the two fields at $\omega_1$ and $\underline{r}$ denotes a spatial position, using Equations (8) and (10), $\Delta n(\omega_2)$ can be written as:

$$\Delta n(\omega_2) = \beta_1 [E_1 E'^*_1 e^{i(\underline{K}_1 - \underline{K}'_1)\underline{r}} + c.c.] \quad (12)$$

The spacing d between two adjacent maxima of the modulation is given by $$d = \frac{\lambda_1}{2n_0(\lambda_1)\sin\alpha} \quad (13)$$

where $\alpha$ is half the angle between $\underline{K}_1$ and $\underline{K}'_1$ and $n_0(\lambda)$ is the refractive index of the unperturbed gaseous medium at wavelength $\lambda_1$.

If a third beam of light at frequency $\omega_2$, $[\epsilon_2(\omega_2)]$ is incident on the volumetric grating at an angle $\theta$ to the planes of constant refractive index such that $\theta$ satisfies the Bragg condition:

$$2n_0(\lambda_2)d \sin\theta = \lambda_2 \quad (14)$$

then this third beam will be efficiently deflected by the grating if the gaseous medium is under collision-dominated conditions, as is shown below.

With the formation of $\epsilon'_2(\omega_2)$ by deflection of $\epsilon_2(\omega_2)$ (see FIG. 2) by the real-time grating: the interference between $\epsilon_2(\omega_2)$ and $\epsilon'_2(\omega_2)$ generates a real-time holographic grating with sinusoidal spatial modulation of the refractive index at frequency $\omega_1$, given by:

$$\Delta n(\omega_1) = \beta_2 E_2 E'_2{}^* \{e^{i(\underline{K}_2 - \underline{K}_2')\underline{r}} + c.c.\} \quad (15)$$

where $\underline{K}_2$ and $\underline{K}_2'$ are the respective wave vectors of $\epsilon_2$ and $\epsilon'_2$ and $\beta_2$ is given by Equations (9) and (11).

The refractive index grating $\Delta n(\omega_1)$ will have the same geometry as that of the refractive index grating $\Delta n(\omega_2)$ generated by the interference of $\epsilon_1(\omega_1)$ and $\epsilon'_1(\omega_1)$. Therefore the grating generated by the fields $\epsilon_1(\omega_1)$ and $\epsilon'_1(\omega_1)$ reflects $\epsilon_2(\omega_2)$ into $\epsilon'_2(\omega_2)$ (or vice versa), while the grating generated by the fields $\epsilon_2(\omega_2)$ and $\epsilon'_2(\omega_2)$ reflects $\epsilon_1(\omega_1)$ into $\epsilon'_1(\omega_1)$ (or vice versa).

Under collision-dominated conditions $\epsilon_2(\omega_2)$ may be almost totally deflected into $\epsilon'_2(\omega_2)$ (unit conversion efficiency) without having to invest an unreasonably larger power at frequency $\omega_1$ as will now be shown.

The combination of Equations (13) and (14) provides:

$$\sin\theta = \frac{n_o(\lambda_1)\lambda_2}{n_o(\lambda_2)\lambda_1} \sin\alpha \quad (16)$$

i.e., the deflection angle $(2\theta)$ of the controlled beam can be selected for given $\lambda_1$ and $\lambda_2$ by choosing an appropriate angle $\alpha$.

In a real-time grating as described above, there are four fields interacting with each other via the nonlinear polarization of the gaseous medium.

The field equation is:

$$\nabla^2 \epsilon(\omega_i) + \frac{\omega_i^2}{c^2} \epsilon(\omega_i) \epsilon(\omega_i) = 0 \quad (17)$$

where $\nabla$ is the gradient operator with components $\partial/\partial x$, $\partial/\partial y$, and $\partial/\partial z$ along x, y and z, respectively, $$\epsilon(\omega_1) = \epsilon_1(\omega_1) + \epsilon'_1(\omega_1),$$

$$\epsilon(\omega_2) = \epsilon_2(\omega_2) + \epsilon'_2(\omega_2)$$

and $$\epsilon(\omega_i) = n_o^2 + 2n_o \Delta n(\omega_i).$$

Writing $$\epsilon_i = \tfrac{1}{2}[E_i e^{i(\underline{K}_i \underline{r} - \omega_i t)} - c.c.],$$

imposing the Bragg condition:

$$\underline{K}_1 - \underline{K}_1' = \underline{K} = \underline{K}_2 - \underline{K}_2' \quad (18)$$

where $\underline{K}$ is the "grating wave vector", inserting $\Delta n(\omega_i)$ from Equations (12) and (15) into Equation (17), and assuming the slowly varying amplitude approximation (i.e., neglecting terms of the order of $(\partial^2 E_i/\partial x^2)$ provides four coupled equations:

$$i(\underline{K}_2 \nabla)E_2(\underline{r}) + \frac{\omega_2^2}{c^2} n_o \beta_1 E_1 E_1'^* E_2'(\underline{r}) = 0 \quad (19a)$$

$$i(\underline{K}_2' \nabla) E_2'(\underline{r}) + \frac{\omega_2^2}{c^2} n_o \beta_1 E_1^* E_1' E_2(\underline{r}) = 0 \quad (19b)$$

$$i(\underline{K}_1 \nabla)E_1(\underline{r}) + \frac{\omega_1^2}{c^2} n_o \beta_2 E_2 E_2'^* E_1'(\underline{r}) = 0 \quad (19c)$$

$$i(\underline{K}_1' \nabla)E_1'(\underline{r}) + \frac{\omega_1^2}{c^2} n_o \beta_2 E_2^* E_2' E_1(\underline{r}) = 0 \quad (19d)$$

Using straightforward manipulation, Equations (9a)-(9d) provide a set of equations describing the rate of change of photons in each field:

$$\frac{1}{\omega_2} \frac{\partial |E_2|^2}{\partial r_2} = \frac{2\beta_1}{c} \operatorname{Im}(R) \quad (20a)$$

$$\frac{1}{\omega_2} \frac{\partial |E_2'|^2}{\partial r_2'} = -\frac{2\beta_1}{c} \operatorname{Im}(R) \quad (20b)$$

$$\frac{1}{\omega_1} \frac{\partial |E_1|^2}{\partial r_1} = -\frac{2\beta_2}{c} \operatorname{Im}(R) \quad (20c)$$

$\operatorname{Im}(R)$ means the imaginary part of R, and $\partial/\partial r_i$ mean $1/K_i(\underline{K}_i \nabla)$, i.e., the gradient along the propagation direction of the appropriate field.

Addition of Equations (20a) to (20b) and Equations (20c) to (20d) provides photon conservation laws:

$$\frac{1}{\omega_2} \frac{\delta |E_2|^2}{\delta r_2} + \frac{1}{\omega_2} \frac{\delta |E'_2|^2}{\delta r'_2} = 0 \quad (21a)$$

$$\frac{1}{\omega_1} \frac{\delta |E_1|^2}{\delta r_1} + \frac{1}{\omega_1} \frac{\delta |E'_1|^2}{\delta r'_1} = 0 \quad (21b)$$

Equations (21a) and (21b) state that at any point in the interaction regions, photons from the field $\epsilon_2$ are converted into photons in the field $\epsilon'_2$ (or vice versa) and photons from the field $\epsilon'_1$ are converted into photons in the field $\epsilon_1$ (or vice versa), in such a way that the sum of the photon number densities of $\epsilon_2$ and $\epsilon'_2$ as well as the sum of the photon number densities of $\epsilon_1$ and $\epsilon'_1$ is conserved.

Subtraction of Equations (20d) from (20a) and Equations (20c) from (20b) provides:

$$\frac{1}{\omega_2} \frac{\delta |E_2|^2}{\delta r_2} - \frac{1}{\omega_1} \frac{\delta |'_1|^2}{\delta r'_1} = \frac{2(\beta_1 - \beta_2)}{C} \operatorname{Im}(R) \quad (22a)$$

$$\frac{1}{\omega_2} \frac{\delta |E'_2|^2}{\delta r'_2} - \frac{1}{\omega_1} \frac{\delta |E_1|^2}{\delta r_1} = -\frac{2(\beta_1 - \beta_2)}{C} \operatorname{Im}(R) \quad (22b)$$

As has previously been shown, under collision-free conditions $\beta_1 = \beta_2$. As may be seen from Equations (22a) and (22b), under these conditions the rate of change of the photon number density of the field $\epsilon_2$ equals that of $\epsilon'_1$. This is to say, under collision-free conditions, for any photon converted from $\epsilon_2$ into $\epsilon'_2$, a photon is converted from $\epsilon'_1$ into $\epsilon_1$. In this limit the process is precisely a phase-matched four-photon parametric process which is well known in solid and gaseous media. Under these conditions complete deflection of an intense laser beam at frequency $\omega_2$ necessitates an intense laser beam at frequency $\omega_1$ with at least the same photon number density as that of the deflected beam.

The situation is, however, completely different when the gaseous medium is under collision-dominated conditions, i.e., $|\beta_1| >> |\beta_2|$. From Equations (21) and (22) it can be seen that under collision dominated conditions an intense field $E_2$ can be converted into $E'_2$ with relatively small conversion of $E'_1$ into $E_1$. It is emphasized here that under collision-dominated conditions, as will be shown hereinafter, the power requirement of the fields generting the grating ($\epsilon_1$ and $\epsilon'_1$), for efficient deflection of the field $\epsilon_2$, is independent of the power of the deflected field. This contrasts with the prior art four-wave-mixing process (under collision-free conditions) for which the Manley-Row relations dictate that for each reflected photon of $\epsilon_2$, a photon of $\epsilon'_1$ has to be converted into $\epsilon_1$ as discussed above. The above noted deviation from the limitations of a true four-wave-mixing process is possible because under collision-dominated conditions momentum is imparted to the atomic or molecular species. Thus conservation of momentum is not satisfied by the fields themselves and the main contribution to nonlinear dispersion at $\omega_2$ is not by four-wave-mixing, but rather by scattering of photons at frequency $\omega_2$ by atoms (or molecules) in level 1. It should be emphasized here that the above conclusions are true for the collision-dominated regime even if one operates far from resonance on the 0→1 transition, i.e., $|\delta_o| >> 1/\tau_{10}$.

From Equations (22), the condition for large photon conversion of $\epsilon_2$ into $\epsilon'_2$ with relatively small conversion of $\epsilon'_1$ into $\epsilon_1$ is:

$$`(\beta_1 - \beta_2)\text{Im}(R) < 0 \tag{23}$$

From Equation (20b), the condition for a positive gain for $E'_2$ is:

$$\beta_1 \text{Im}(R) < 0 \tag{24}$$

The two requirements of Equations (17) and (18) are compatible under collision-dominated conditions for which $$|\beta_1| >> |\beta_2|$$

Under collision-dominated conditions $\beta_1$ can be positive or negative depending on the sign of $\Delta_o$ (see Equation (8)).

Since $\text{Im}(R) = \text{Im}(E_1^* E'_1 E_2 E'_2{}^*)$, the sign of Im(R) is dependent on the initial phase of the reflected field $E'_2$. The inequality of Equation (24) means that for a given $\beta_1$ only a field with the appropriate initial phase (relative to the initial phases of $E_1$, $E'_1$ and $E_2$) that satisfies the inequality of Equation (24) will have a positive gain and will be generated.

For a consideration of reflection efficiency, reference is now made to Equation (19) for the fields. Under collision-dominated conditions the attenuation of the fields $E'_1$ and $E_1$ is mainly due to absorption losses in the gaseous medium. Assuming that $\gamma(\omega_1)L < 1$, where $\gamma(\omega_1)$ is the absorption coefficient at $\omega_1$ and L is the interaction length, then $E_1$, $E'_1 \sim$ const and Equations (19l)–(19d) reduce to two equations for $E_2$ and $E'_2$:

$$2i(\underline{K_2}\underline{\nabla})E_2(\underline{r}) + \frac{\omega_2{}^2}{C^2} n_o \Delta n_o(\omega_2) E'_2(\underline{r}) = 0 \tag{25a}$$

$$2i(\underline{K'_2}\underline{\nabla}) E'_2(\underline{r}) = \frac{\omega_2{}^2}{C^2} n_o \Delta n_o(\omega_2) E_2(\underline{r}) = 0 \tag{25b}$$

where $\Delta n_o(\omega_2)$ is the amplitude of the sinusoidal refractive index modulation. It is to be noted here that the assumption that the main intensity change in $E_1$ (and $E'_1$) is due to absorption is valid only when $2|\beta_2|\omega_1|E_2|^2/c << L_{65}(\omega_1)$ [see Equations (20c) and (20d)]. This puts an upper limit on the intensities $|E_2|^2$ and $|E'_2|^2$ for which Equations (25a) and (25b) are valid. In the following discussion it is assumed that $|E_2|^2$, $|E'_2|^2$ are below the above noted limit. In the more general case of higher intensity the four coupled Equations (19) must be solved.

Equations (25) are the same as those describing a lossless volumetric dielectric grating and these equations have been solved by Kogelnik in the plane-wave approximation for a transmission-grating geometry as well as for a reflection-grating geometry.

Before discussing the solutions, the two geometries, using the slant angle $\phi$ as introduced by Kogelnik and shown in FIG. 3 will be defined. As in FIG. 2 the x=0 plane is the plane where the grating planes start and is the beginning of the interaction region and the plane x=L is the plane where the grating planes end and the interaction region ends. $\phi$ is the slant angle, which is the angle between the normal to the grating planes and the x axis. $\theta$ is the angle between $\underline{K}_2$ and the grating planes, and it is assumed that $\theta$ satisfies the Bragg condition. $\gamma$ is the angle between $\underline{K}'_2$ (the wave vector of the deflected or reflected beam) and the x-axis.

A transmission grating is provided when $\gamma < \pi/2$ and a reflection grating is provided when $\gamma > \pi/2$. It can be shown from geometrical considerations that one gets a transmission geometry when $\theta < \phi$, and a reflection geometry when $\theta > \phi$. In particular, when $\phi = \pi/2$ there exists a transmission geometry for all $0 \leq \theta < \pi/2$, and when $\phi = 0$ there exists a reflection geometry for all values of $0 < \theta \leq \pi/2$.

Referring now to Equations (25) and using Kogelnik's solution the deflection efficiency in the transmission geometry is defined by:

$$\eta_{tr} = \frac{E'_2|(L)|^2}{|E_2(0)|^2} = \sin^2\left(\frac{\pi \Delta n_0 L}{\lambda_2[\sin(\phi - \Theta)\sin(\phi + \Theta)]^{\frac{1}{2}}}\right) \tag{26}$$

where $\theta$ is assumed to satisfy the Bragg condition of Equation (16). Similarly, the reflection efficiency for the reflection geometry may be shown to be:

$$\eta_{ref} = \frac{E'_2|(0)|^2}{|E_2(0)|^2} =$$

$$\left\{ 1 + \frac{1}{\sinh^2\left(\frac{\pi \Delta n_0 L}{\lambda_2[\sin(\Theta - \phi)\sin(\Theta + \phi)]^{\frac{1}{2}}}\right)} \right\}^{-1}$$

For transmission geometry $\theta < \phi$ and for reflection geometry $\theta > \phi$, so both expressions are well defined.

If, for the sake of simplicity, it is assumed $\phi = \pi/2$ for the transmission geometry and $\phi = 0$ for the reflection geometry, then:

$$\eta_{tr} = \sin^2\left(\frac{\pi \Delta n_0 L}{\lambda_2 \cos\Theta}\right) \quad (28)$$

$$\eta_{ref} = \left\{1 + \frac{1}{\sinh^2\left(\frac{\pi \Delta n_0 L}{\lambda_2 \sin\Theta}\right)}\right\}^{-1} \quad (29)$$

where $\theta$ is the Bragg angle for the field $\epsilon_2$, and $\Delta n_0$ is the amplitude of the sinusoidal refractive index modulation at frequency $\omega_2$, generated by the fields $\epsilon'_1$ and $\epsilon_1$.

Consideration will now be given to transmission geometry (beam deflection with $\phi = \pi/2$) using Equation (28) for deflection efficiency. Modification of the results for reflection geometry (using Equations (29) or (27)) is straightforward.

Under collision-dominated conditions in accordance with the invention the effect of diffusion can be accounted for by writing Equation (28):

$$\eta = \sin^2\left(\frac{\pi \Delta n_0 L}{\lambda_2 \cos\theta}\right) \eta_D \quad (30)$$

Here $\eta_D$ is an efficiency factor determined by diffusion and given by:

$$\eta_D = \frac{1/\tau_{11}}{1/\tau_{11} + 1/\tau_D} \quad (31)$$

where $\tau_D$ is the characteristic time constant for the dissipation of the real-time grating by diffusion.

The diffusion equation for a refractive index grating is:

$$\frac{\partial(\Delta n)}{\partial t} = D \frac{\partial^2(\Delta n)}{\partial y^2} \quad (32)$$

where y is the direction of the grating modulation (see FIG. (2)) and D is the diffusion constant in the gaseous medium. Writing $\Delta n$ as:

$$\Delta n = \Delta n_o \cos(Kr) \quad (33)$$

and noting that $n_o(\lambda_1) \sim 1$, so that $$K = \frac{2\pi}{d} = \frac{4\pi \sin\alpha}{\lambda_1},$$

we get for the diffusion time constant:

$$\tau_D = \frac{1}{DK^2} = \frac{\tau_1^2}{(4\pi)^2 D \sin^2\alpha} \quad (34)$$

Diffusion can be neglected only if $\tau_D \gg \tau_{11}$, i.e., when:

$$\sin\alpha < \frac{\lambda_1}{4\pi}\sqrt{\frac{1}{\tau_{11}D}} \quad (35)$$

Equation (35) set forth immediately hereinabove states that for a given gaseous medium diffusion can be neglected if the angle of incidence $\alpha$ of the beams generating the real time grating is small enough (i.e., the spacing between the grating maxima is large enough). It is to be remembered here that a small $\alpha$ means also a relatively small deflection angle $\theta$ by virtue of Equation (16). For larger angles diffusion will cause an increase of the power requirements to compensate for the additional dissipation of the refractive index modulation, as will be shown hereinafter.

From Equation (30) it will be seen that under collision dominated conditions in accordance with the invention unit conversion efficiency of $E_2$ into $E'_2$, i.e., total deflection of a beam at frequency $\omega_2$ impinging at the Bragg angle $\theta$ is possible if $$\Delta n_0 L = \frac{\lambda_2 \cos\theta}{2\eta_D} \quad (36)$$

Considering now intensity requirements, the intensity $I_1$ of the field at frequency $\omega_1$, required for total deflection of the beam at $\omega_2$ (see FIG. (2)) can be calculated from Equation (36). From Equation (8) $\Delta n_0$ can be written as:

$$\Delta n_0 = A\gamma(\omega_1)\tau_{11}I_1 \quad (37)$$

where $$A = 1.1 \times 10^9 \frac{f_{12} \tilde{\Delta}_o}{\tilde{v}_{10}\tilde{v}_{21}|\tilde{\Delta}|^2} \quad (38)$$

$f_{12}$—is the oscillator strength for the $1 \to 2$ transition; $v_{ij}$ is the energy separation between the corresponding levels, all energies are measured in cm$^{-1}$ and $I_1$ in Equation (37) is in units of W/cm$^2$. Substituting Equation (37) into Equation (36) and requiring that $$\frac{\gamma(\omega_1)L}{\cos\alpha} < 1 \quad (39)$$

i.e., approximately constant refractive index modulation amplitude in the medium, it may be concluded that the intensity $I_1$ at frequency $\omega_1$ necessary to totally deflect a beam at frequency $\omega_2$ impinging at the Bragg angle $\theta$ has to satisfy $$I_1 > \frac{\lambda_2\sqrt{\lambda_1^2 - \lambda_2^2\sin^2\alpha}}{2A\lambda_1\tau_{11}\cos\alpha}\left(\frac{\lambda_1^2 + (4\pi)^2\tau_{11}D\sin^2\alpha}{\lambda_1^2}\right) \quad (40)$$

where is deriving of Equation (40) it has been assumed for the sake of simplicity that $n_o(\lambda_i) \sim 1$. From Equation (40) the following conclusions can now be drawn:

(a) Under collision-dominated conditions in accordance with the invention the intensity requirement of $I_1$ is independent of the intensity of the beam of frequency $\omega_2$. It is to be noted here that the assumption that the main intensity change in $E_1$ (and $E'_1$) is due to absorption is valid only when $2|\beta_2||\omega_1||E_2|^2/c \ll \gamma(\omega_1)$ [see Equations (20c) and (20d)]. This puts an upper limit on the intensities $|E_2|^2$ and $|E'_2|^2$ for which Equations (25a) and (25b) are valid. In the following discussion it is assumed that $|E_2|^2$, $|E'_2|^2$ are below the above noted limit.

(b) For large diffusion coefficient D, (i.e., when the refractive index modulation is dissipated mainly by diffusion), the intensity requirement of Equation (40) is independent of the lifetime $\tau_{11}$ of level 1.

(c) For $\lambda_2 > \lambda_1$, the intensity requirement for total deflection is more moderate than for $\lambda_2 < \lambda_1$. In fact if $\lambda_2 > \lambda_1$, then selecting the angle $\alpha$ of the fields that generate the grating (see FIG. 2) such that $$\alpha = \frac{\lambda_1}{\lambda_2}$$

will reduce the right-hand side of inequality in Equation (34) to zero. The corresponding Bragg angle $\theta$ in this case is 90° and for this angle Equation (28) has to be used.

Consider now the power requirements as a function of $\alpha$ for a typical case, first when $\lambda_2 < \lambda_1$ and then when $\lambda_2 > \lambda_1$. For the case where $\lambda_2 < \lambda_1$, typical operating conditions may be assumed to be:

$\lambda_1 = 5000$ Å

$\lambda_2 = 4000$ Å

$f_{12} = 0.1$ $v_{10} = 2 \times 10^4$ cm$^{-1}$ $v_{21} = 2.5 \times 10^4$ cm$^{-1}$ $\Delta_0 = 10$ cm$^{-1}$ $\tau_{11} = 10$ nsec $D = 0.1$ cm$^2$/sec (1 Atm gas)

Using the above noted assumptions the intensity requirement as a function of the angle $\alpha$ is given immediately herein below in Table 1.

TABLE 1

| $\alpha$ | $2\Theta$ | $I_1 >$ (MW/cm$^2$) |
|---|---|---|
| 6° | 9.6° | 0.15 |
| 30° | 47° | 1.6 |
| 60° | 88° | 6 |

The deflection angle $2\theta$ of the deflected beam appropriate for the specified value of $\alpha$ is given in the second column of Table 1 above. The increase in the intensity requirements with increasing $\alpha$ is mainly because of the dissipating effect of diffusion as discussed before.

For the case where $\lambda_2 > \lambda_1$, typical operating conditions may be assumed to be:

$\lambda_1 = 50000$ Å

$\lambda_2 = 1\mu$ $f_{12} = 0.1$ $v_{10} = 2.10^4$ cm$^{-1}$ $v_{21} = 10^4$ cm$^{-1}$ $\Delta_0 = 10$ cm$^{-1}$ $\tau_{11} = 10$ nsec $D = 0.1$ cm$^2$/sec Again, using its above noted assumptions the corresponding intensity requirement is given immediately hereinbelow in Table 2.

TABLE 2

| $\alpha$ | $2\Theta$ | $I_1 >$ (MW/cm$^2$) |
|---|---|---|
| 6° | 24° | 0.15 |
| 20° | 86° | 0.6 |
| 25° | 116° | 0.66 |
| 28° | 140° | 0.5 |
| 29° | 152° | 0.4 |
| 30° | 180° | — |

From the two examples set forth above it may now be seen that total deflection of a laser beam at $\omega_2$ in an appropriate gaseous medium is possible using moderate intensities of the field at $\omega_1$, the power requirement increasing with increasing deflection angle. However, this increase is more moderate if one selects for a given $\omega_2$ an appropriate gaseous medium and $\omega_1$ such that $\lambda_1 < \lambda_2$.

A real-time holographic curved reflector or a lens in accordance with the invention for a laser at frequency $\omega_2$ can be generated by interfering two mutually coherent beams at frequency $\omega_1$ having appropriate phase fronts in an appropriate nonlinear dispersive gaseous medium more fully discussed hereinafter.

Directing attention now to FIG. 4, a real-time holographic lens for frequency $\omega_2$ can be produced for example by interfering in the medium two mutually coherent beams at frequency $\omega_1$ where one $[\epsilon_1(\omega_1)]$ is a plane wave and the other $[\epsilon'_1(\omega_1)]$ is a spherical wave as shown in FIG. 4. This interference results in surfaces of constant intensity, which are paraboloids of revolution around the optical axis given by:

$$R^2 = 2Zm\lambda_1 + (m\lambda_1)^2 \tag{41}$$

where m is a positive integer (0, 1, 2 ...) and R is the radius vector in the xy plane. This intensity modulation at $\omega_1$ produces in turn a real-time refractive index modulation for light at frequency $\omega_2$. A beam $\epsilon_2(\omega_2)$ at frequency $\omega_2$ impinging from the right will be condensed by the lens while a similar beam impinging from the left will diverge, provided that (a) the Bragg condition is satisfied for its entire cross section, and (b) the interaction is strong enough to divert the beam at $\omega_2$ completely.

Since the real-time holographic lens is generated by interference of beams of wavelength $\lambda_1$, then according to the principle of holographic reconstruction, the Bragg condition is fully satisfied for a beam at wavelength $\lambda_1$. Clearly the Bragg condition will also be satisfied by $\lambda_2$ if $$\lambda_1 n_o(\lambda_2) = \lambda_2 n_o(\lambda_1) \tag{42}$$

The only way that this can be satisfied for $\lambda_1 \neq \lambda_2$ is if linear anomalous dispersion at $\lambda_1$ or $\lambda_2$ will be large enough to compensate for the difference in the wavelengths.

Referring to FIG. 1, for off-resonance conditions on $0 \to 1$ transition, i.e., $|\delta_0| \gg 1/\tau_{10}$:

$$n_0(\lambda_1) = 1 + \frac{B}{\Delta\lambda_1} \quad (43)$$

where $$B = \frac{R_0 f_{01} N}{4\pi v_{10}^3}$$

and $\Delta\lambda_1$ is the difference between $\lambda_1$ and the wavelength for resonance transition on $0 \to 1$. $R_0$ is the classical radius of the electron ($2.8 \times 10^{-13}$ cm). Similarly, $$n_0(\lambda_2) = 1 + \frac{B}{\Delta\lambda_2} \quad (44)$$

Inserting into Equation (42) and assuming that $\lambda_2$ is far from resonance for the $0 \to 1$ transition so that we can neglect $B/\Delta\lambda_2$:

$$\Delta\lambda \cong B \frac{\lambda_1}{\Delta\lambda_1} \quad (45)$$

where $\Delta\lambda = \lambda_1 - \lambda_2$.

Taking as an example $f_{01} = 0.5$, $v_{10} = 2 \times 10^4$ cm$^{-1}$, and $\Delta\lambda_1 \sim 1$ Å:

$$\Delta\lambda(Å) = 7 \times 10^{-16} \times N$$

For $\Delta\lambda = 700$ Å one needs a density of $10^{18}$ atoms/cm$^3$. It should be mentioned here that in principle it is possible to satisfy Equation (42), by using a mixture of two gases, where one gas is the active one for the nonlinear processes discussed above, and the other gas is a background gas providing the necessary linear dispersion to satisfy Equation (42).

When the radius of curvature of the constant refractive index lines in the yz plane is large compared to the beam diameter, one can approximate the lens to the planar grating earlier discussed herein in detail. In this case, provided that the Bragg condition is satisfied by use of linear dispersion in gas mixtures as discussed above, the intensity requirement for efficient operation of the lens is similar to that for a grating, as given by Equation (40).

Gaseous mediums suitable for purposes of the present invention include an atomic or molecular principal gas in combination with a buffer gas. Buffer gases may include inert gases such as, for example, helium, argon, zenon, krypton and the like. While, as noted above, the present invention contemplates the use of molecular gases, best results are more likely to be obtained with atomic gases such as, for example, alkali gases including sodium, rubidium, potassium and the like.

Broadly, a buffer gas or gases are suitable that spectrally broaden the revelent transitions of the prinicpal gas and which does not interfere with previously discussed functions of the principal gas.

By way of example, in accordance with the invention a suitable gaseous medium may be maintained at a total pressure of about one tenth atmosphere to one atmosphere or more and comprise an atomic gas at about one thousandth atmosphere and a buffer gas or gases comprising the balance of the pressure and gaseous medium.

Specific pressures and mixture of gases will vary since for a given application gases and laser wavelengths are chosen that the laser beam wavelength or wavelengths at least substantially match revelent primary transitions, i.e., near resonance conditions as discussed in connection with FIG. 1 are obtained.

Typical apparatus forming the means to retain a suitable gaseous medium to define a grating, lens, prism or the like in accordance with the invention is shown in FIG. 5. Where an alkali gas such as, for example, sodium is used a gas cell 10 having oppositely disposed windows 11 and 12 transparent to the laser beams being used is disposed in a conventional oven 13 adapted to maintain the gaseous medium at a suitable temperature of, for example, about 300° C.

The oven 13 is also provided with windows 14 and 15 similar to and coaxial with windows 11 and 12 to permit the laser beams as previously described to enter and leave or be reflected from the gas cell 10 as the case may be. If the gas cell is heated directly the oven may be omitted.

The gas cell may be provided with a conventional cold finger 20 communicating with the interior of the gas cell and containing a sodium pellet 21 or the like. Coil 22 designates any suitable and conventional means for either adding or removing heat from the cold finger 20 as circumstances may require to maintain the temperature within cold finger 20 at a desired constant temperature several degrees less than the temperature within the main portion 23 of the gas cell 10. The interior of the gas cell is selectively coupled to a vacuum source to maintain the interior of the gas cell at the desired pressure in the event it is to be less than atmospheric and is also selectively coupled to a suitable source of buffer gas. The interior of the oven 13 may also be coupled to a vacuum source to prevent the existence of any undesirable gases between windows 14 and 11 and windows 12 and 15.

Whereas the gas cell 10 of FIG. 5 has been shown having curved top and bottom walls 25 and 26 the invention is not so limited and such walls may be flat or otherwise configured as may be required or desired. Regarding selection of the length of the reaction region, i.e., the distance between windows 11 and 12, such is discussed in connection with FIGS. 2 and 3.

Considering now the preceding discussion relating to holographic optics the interference of two coherent laser beams at wavelength $\lambda_1$, in accordance with the invention will generate a realtime refractive index volumetric grating in the gaseous medium for a laser beam at wavelength $\lambda_2$. If the phase fronts of the laser beams at wavelength $\lambda_1$ are flat a volumetric grating is generated consisting of planes of constant refractive index with sinusoidal modulation of the refractive index perpendicular to those planes as illustrated in FIG. 2.

A laser beam at wavelength $\lambda_2$ will consequently be coherently diffracted by the grating provided its angle of incidence to the planes of constant refractive index satisfies the Bragg condition. Such a grating can be generated as a transmission grating where the laser beam at wavelength $\lambda_2$ is deflected or reflected at up to 180°.

It has been previously pointed out that the response time of the gaseous medium is dependent on the lifetimes involved and gaseous diffusion, and can be made as short as a nanosecond. Thus the grating may also operate as a fast switch for high power lasers, the response time being determined by the longer of the gaseous response time and the rise time of the controlling laser at wavelength $\lambda_1$. A further advantage is that such a switch does not necessitate a good beam quality of the controlling laser at wavelength $\lambda_1$. For a simple switch, transmission grating or reflection grating, only a single controlling laser beam at wavelength $\lambda_1$ is needed.

If the aforementioned two interfering laser beams have phase fronts as shown and discussed in connection with FIG. 4, for example, realtime spherical or curved reflectors or lenses will be generated. Thus, if a paraxial laser beam at wavelength $\lambda_2$ impinges on the gaseous medium from the right, it will be coherently diffracted by the realtime curved grating and will be focused at the origin (0,0), provided it satisfies the Bragg condition for its entire cross section. Similarly, if this laser beam impinges on the gaseous medium from the left, it will be coherently diffracted and diverge with the origin (0,0) as a virtual focal point.

In addition to the above, where the laser beam at wavelength $\lambda_2$ is at a higher power level than the laser beams at wavelength $\lambda_1$, a realtime holographic amplifier is produced.

Since the nonlinear dispersion process is a near-resonance effect, it is wavelength sensitive. Accordingly, if the gaseous medium comprises a mixture of three gases, each one of them interacting nonlinearly with one set of two wavelengths $\lambda_1:\lambda_2$, a realtime color holographic display may be generated by choosing the three sets of $\lambda:\lambda_2$ such that the three wavelengths $\lambda_2$ corresponding to the three gases comprising the gaseous medium are in the range of the three basic colors necessary for a color display.

Figure 6:
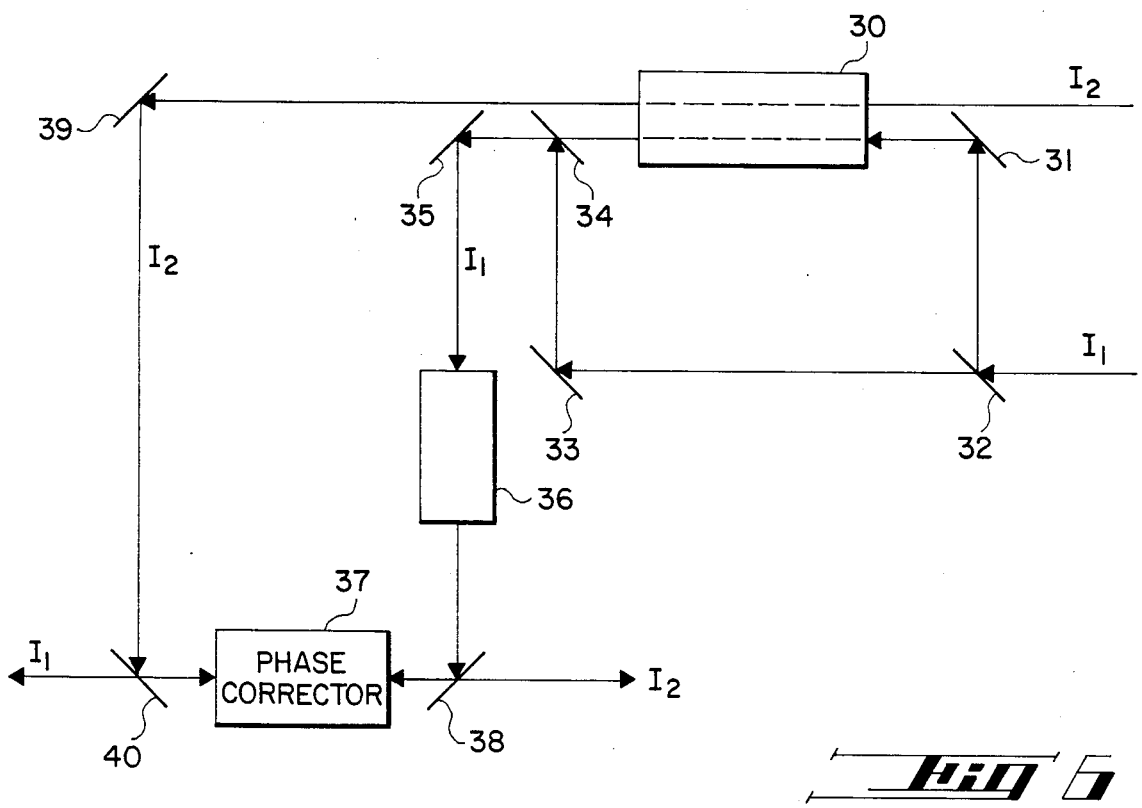
FIG. 6 is a schematic diagram of apparatus for correcting aberrations imposed on a laser beam.

Attention is now directed to FIG. 6 which shows aberration corrector means in accordance with the present invention for correcting phase front aberrations in a laser beam caused by passing the laser beam through means such as, for example, a laser amplifier.

It is of course, desirable in transmitting or amplifying any signal whether electrical, optical or acoustical, that the signal be processed with as little distortion as possible. Consider now a laser beam $I_2$ which by way of example, is amplified in a laser amplifier 30 which produces aberrations on the wavefront of the amplified output beam.

In accordance with the invention amplifier 30 forms one leg of an interferometer such as, for example, a Mach-Zender interferometer. Laser beam $I_2$ at wavelength $\lambda_2$ is introduced into the amplifier 30. A diffraction limited laser beam $I_1$ at wavelength $\lambda_1$ is caused to impinge on a beam splitter 32 whereby one half of it is reflected to mirror 31 and reflected therefrom into amplifier 30 coaxial with laser beam $I_2$. The other half of laser beam $I_1$ passes through beam splitter 32 and is reflected by mirror 33 to member 34 where it is reflected to member 35. The part of laser beam $I_1$ that goes through amplifier 30 picks up the same aberrations imposed on laser beam $I_2$. This portion of laser beam $I_1$ passes through dichroic member 34 which provides maximum transmission of laser beam $I_1$ where it combines and interferes with the "clean" or undistorted portion of laser beam $I_1$. Upon interference of the aforementioned two portions of the laser beam $I_1$ at member 34 at the output of the interferometer, the local phase front aberrations are translated to intensity modulations across the cross section of the now recombined laser beam $I_1$. It is necessary, of course, that prior to use the interferometer be aligned to produce full phase front interference, i.e., there are no fringes when there is no aberration.

The now recombined laser beam $I_1$ now carries the phase distortion information of amplifier 30 as intensity modulation across the beam cross section and is amplified where necessary in amplifier 36 to the required amplitude. Amplifier 36, where present, should add as little aberration as possible to the recombined laser beam $I_1$. Since phase corrector 37 more fully described hereinafter will provide phase lags of a fraction of a wavelength over its entire length of interaction, the power requirements of laser beam $I_1$ will be quite moderate and amplifier 36 can indeed be made to provide very little if any distortion.

After passing through amplifier 36 recombined laser beam $I_1$ via mirror 38 is introduced into phase corrector 37. Similarly, after passing through amplifier 30 laser beam $I_2$ via mirrors 39 and 40 is also introduced in phase corrector 37. Laser beam $I_1$ and $I_2$ are introduced collinearly but in opposite directions into phase corrector 37 which comprises a gas cell containing a gaseous medium as shown and described in connection with FIG. 1 through 5. Recombined laser beam $I_1$ exits through dichroic member 40 and the corrected laser beam $I_2$ exits through dichroic member 38 as shown in FIG. 6.

In phase corrector 37, as previously described, the intensity modulation across the cross section of laser beam $I_1$ introduced therein is transformed by nonlinear dispersion interaction into reflective index variations at wavelength $\lambda_2$ which causes, in turn, corresponding phase changes across the phase front of laser beam $I_2$ which is at wavelength $\lambda_2$.

Changing the path length of one leg of the interferometer changes the phase of the refractive index modulation across the width of the phase corrector. Thus, proper adjustment of this path length results in adjustment of the phase corrector 37 to compensate and correct for the phase front aberrations imposed on laser beam $I_2$ by amplifier 30.

The response time of phase corrector 37 is, as previously noted, determined by the lifetimes and diffusion involved in he gaseous medium and can be as short as one nanosecond. Thus, a main advantage of an aberration corrector in accordance with the invention as discussed above is that it permits correction of rapid phase front aberrations.

We claim:

1. In the method of controlling a laser beam the steps comprising:
    (a) providing a gaseous medium comprising a mixture of a first gas and a buffer bas, said first gas being provided at about one thousandth of an atmosphere and having a first resonance transition and a second higher transition where both said transitions are allowed electric dipole transitions, said buffer gas being provided at about one tenth of at atmosphere and substantially collisionally broadening said first and second transitions of said first gas;
    (b) maintaining said gaseous medium at "a pressure" said pressure whereby spectral broadening of the said first and second transitions is collision-dominated;
    (c) causing a first controlling laser beam having a first wavelength to be incident on said gaseous medium, said first wavelength being at least near resonance with said first transition and inducing a predetermined nonthermal change in the refractive index of said gaseous medium at a second wavelength as a result of absorption by said first gas at said first transition and thereby producing an excited state of atoms in the absence of producing a thermal gradient; and (d) causing a controlled laser beam having a predetermined wavelength to be incident on said gaseous medium, said predetermined wavelength being at least near said second wavelength and also at least near resonance with said second transition whereby said controlled laser beam sees said predetermined change in the refractive index produced by said nonthermal change in the said refractive index, the energy of said controlled laser beam being substantially greater than that of said controlling laser beam and producing interference fringe planes in said gaseous medium as it passes through said gaseous medium and the angle of incidence of said controlled laser beam with respect to said fringe planes is the Bragg angle given by the first quadrant angle whose sine is half the ratio between the wavelength of the controlled laser beam and the spacing between said interference fringe planes.

2. The method as defined in claim 1 wherein said first gas is an atomic gas and said buffer gas is an inert gas and comprises a substantial portion of said gaseous medium.

3. The method as defined in claim 2 wherein said first gas is sodium and said gaseous medium is maintained in a gas cell transparent to said laser beams and said gaseous medium is maintained at a temperature of about three hundred degrees centigrade.

4. The method as defined in claim 1 wherein said first gas is a molecular gas and said buffer gas is an inert gas and comprises substantial portion of said gaseous medium.

5. The method as defined in claim 4 wherein the energy of said controlled laser beam is substantially greater than that of said controlling laser beam.

6. In the method of controlling a laser beam the steps comprising:
   (a) providing a gaseous medium comprising a mixture of a first gas and a buffer gas, said first gas being provided at about one thousandth of an atmosphere and having a first resonance transition and a second higher transition where both said transitions are allowed electric dipole transitions, said buffer gas being provided at about one tenth of an atmosphere and substantially collisionally broadening said first and second transitions of said first gas;
   (b) maintaining said gaseous medium at "a pressure" said pressures whereby spectral broadening of said first and second transitions is collision-dominated;
   (c) producing in said gaseous medium a holographic image resulting from the interference of first and second non-colinear controlling laser beams each at a first wavelength, said first wavelength being at least near resonance with said first transition and inducing a predetermined nonthermal change in the refractive index of said gaseous medium at a second wavelength as a result of absorption by said first gas at said first transition and thereby producing an excited state of atoms in the absence of producing a thermal gradient, said first beam having a plane wave front and said second beam having a spherical wave front; and
   (d) causing a controlled laser beam having a predetermined wavelength to be incident on said gaseous medium, said predetermined wavelength being at least near said second wavelength and also at least near resonance with said second transition whereby said controlled laser beam sees said predetermined change in the refractive index produced by said nonthermal change in the said refractive index, the energy of said controlled laser beam being substantially greater than that of said controlling laser beam and producing interference fringe planes in said gaseous medium as it passes through said gaseous medium and the angle of incidence of said controlled laser beam with respect to said fringe planes is the Bragg angle given by the first quadrant angle whose sine is half the ratio between the wavelength of the controlled laser beam and the spacing between said interference fringe planes.

7. In the method of controlling a laser beam the steps comprising:
   (a) providing a gaseous medium comprising a mixture of a first gas and a buffer bas, said first gas being provided at about one thousandth of an atmosphere and having a first resonance transition and a second higher transition where both said transitions are allowed electric dipole transitions, said buffer gas being provided at about one tenth of at atmosphere and substantially collisionally broadening said first and second transitions of said first gas;
   (b) maintaining said gaseous medium at "a pressure" said pressures whereby spectral broadening of the said first and second transitions is collision-dominated;
   (c) causing a first controlling laser beam having a first wavelength with a plane wave front to be incident on said gaseous medium, said first wavelength being at least near resonance with said first transitions and inducing a predetermined nonthermal change in the refractive index of said gaseous medium at a second wavelength as a result of absorption by said first gas at said first transition and thereby producing an excited state of atoms in the absence of producing a thermal gradient;
   (d) causing a second controlling laser beam at said first wavelength with a spherical wave front to be incident on said gaseous medium at an angle to said first controlling laser beam, said first and second controlling laser beams interfering one with another and producing a holographic image in said gaseous medium; and
   (e) causing a controlled laser beam having a predetermined wavelength to be incident on said gaseous medium, said predetermined wavelength being at least near said second wavelength and also at least near resonance with said second transition whereby said controlled laser beam sees said predetermined change in the refractive index produced by said nonthermal change in the said refractive index, the energy of said controlled laser beam being substantially greater than that of said controlling laser beam and producing interference fringe planes in said gaseous medium as it passes through said gaseous medium and the angle of incidence of said controlled laser beam with respect to said fringe planes is the Bragg angle given by the first quadrant angle whose sine is half the ratio between the wavelength of the controlled laser beam and the spacing between said interference fringe planes.

8. The method as defined in claim 7 wherein the holographic image produced by the interference of said controlling laser beams one with another is a refractive index volumetric grating.

9. The method as defined in claim 8 wherein the phase fronts of both said controlling laser beams are selected to produce in said volumetric grating planes of constant refractive index with sinusoidal modulation of the refractive index perpendicular to said planes.

10. The method as defined in claim 9 wherein said phase fronts are substantially flat.

11. The method as defined in claim 10 wherein said controlled laser beam impinges on said gaseous medium from the same general direction as does said controlling laser beams.

12. The method as defined in claim 10 wherein said controlled laser beam impinges on said gaseous medium in a direction generally opposite to that of said controlling laser beams.

13. The method as defined in claim 8 wherein the phase front of at least one of said controlling laser beams is selected to produce a curved volumetric grating.

14. The method as defined in claim 13 wherein the phase front of one of said controlling laser beams in curved.

15. The method as defined in claim 14 wherein said controlled laser beam impinges on said gaseous medium from the same general direction as does said controlling laser beams.

16. The method as define in claim 14 wherein said controlled laser beam impinges on said gaseous medium a direction generally opposite to that of said controlling laser beams.

* * * * *